US012634090B2

(12) United States Patent
Wang

(10) Patent No.: US 12,634,090 B2
(45) Date of Patent: May 19, 2026

(54) TRANSMISSION RATE DETERMINING METHOD AND COMMUNICATION APPARATUS

(71) Applicant: Huawei Technologies Co., Ltd., Shenzhen (CN)

(72) Inventor: Junjie Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 316 days.

(21) Appl. No.: 18/424,112

(22) Filed: Jan. 26, 2024

(65) Prior Publication Data

US 2024/0171357 A1     May 23, 2024

Related U.S. Application Data

(63) Continuation of application No. PCT/CN2021/109342, filed on Jul. 29, 2021.

(51) Int. Cl.
H04L 5/00          (2006.01)
H04B 5/20          (2024.01)
H04B 5/45          (2024.01)

(52) U.S. Cl.
CPC .............. H04L 5/0055 (2013.01); H04B 5/20 (2024.01); H04L 5/0048 (2013.01); H04B 5/45 (2024.01)

(58) Field of Classification Search
CPC ............................ H04L 5/0048; H04L 5/0055
USPC ......................................................... 370/329
See application file for complete search history.

(56) References Cited

U.S. PATENT DOCUMENTS

2021/0159944 A1*    5/2021    Kim ...................... H03L 7/0802

OTHER PUBLICATIONS

ISO/IEC 14443-3:2018, Cards and security devices for personal identification—Contactless proximity objects—Part 3: Initialization and anticollision, Jul. 2018, total 15 pages.
ISO/IEC 14443-4:2018, Cards and security devices for personal identification—Contactless proximity objects—Part 4: Transmission protocol, Jul. 2018, total 15 pages.

* cited by examiner

*Primary Examiner* — Peter G Solinsky
(74) *Attorney, Agent, or Firm* — Conley Rose, P.C.

(57)              ABSTRACT

In a transmission rate determining method, a proximity coupling device (PCD) sends an activation frame to a proximity integrated circuit card (PICC). The activation frame indicates at least a first transmission rate used to transmit a first information frame and a second transmission rate used to transmit a target frame. The first information frame is used to transmit application information. The target frame includes at least one of a second information frame or a third information frame, the second information frame is used to transmit receive ready information, and the third information frame is used to transmit control information. The PCD receives an acknowledgment frame from the PICC. The acknowledgment frame indicates that the PICC has received the activation frame. Then, the PCD transmits the first information frame with the PICC at the first transmission rate, and transmits the target frame with the PICC at the second transmission rate.

20 Claims, 7 Drawing Sheets

```
┌───────────┐                              ┌───────────┐
│    PCD    │                              │   PICC    │
└───────────┘                              └───────────┘
│                                                │
│  S1: Anti-collision and link establishment process  │
│                                                │
│         I-block frame (848 Kbps)               │
│───────────────────────────────────────────────▶│
│         I-block frame (848 Kbps)               │
│◀───────────────────────────────────────────────│
│                                                │
│         Bit rate request frame (848 Kbps)      │
│───────────────────────────────────────────────▶│
│  S2: Negotiate   Bit rate indication frame (848 Kbps)│
│  a transmission  ◀─────────────────────────────│
│     rate         Bit rate activation frame (848 Kbps)│
│───────────────────────────────────────────────▶│
│         Bit rate acknowledgment frame (848 Kbps)│
│◀───────────────────────────────────────────────│
│                                                │
│         I-block frame (6.78 Mbps)              │
│───────────────────────────────────────────────▶│
│         I-block frame (6.78 Mbps)              │
│◀───────────────────────────────────────────────│
│                                                │
│  S3: Negotiate   Bit rate activation frame (6.78 Mbps)│
│  a transmission  ───────────────────────────────▶│
│     rate         Bit rate acknowledgment frame (6.78 Mbps)│
│◀───────────────────────────────────────────────│
│                                                │
│         I-block frame (106 Kbps)               │
│───────────────────────────────────────────────▶│
│         I-block frame (106 Kbps)               │
│◀───────────────────────────────────────────────│
│                                                │
```

| Proximity coupling device (PCD) 10 | | Proximity integrated circuit card (PICC) 11 |

| Start field | | | Information field | End field |
|-------------|-------|-------|-------------------|-----------|
| PCB | CID | NAD | INF | EDC |

| b8 | b7 | b6 | b5 | b4 | b3 | b2 | b1 |
|----|----|----|----|----|----|----|----|

400

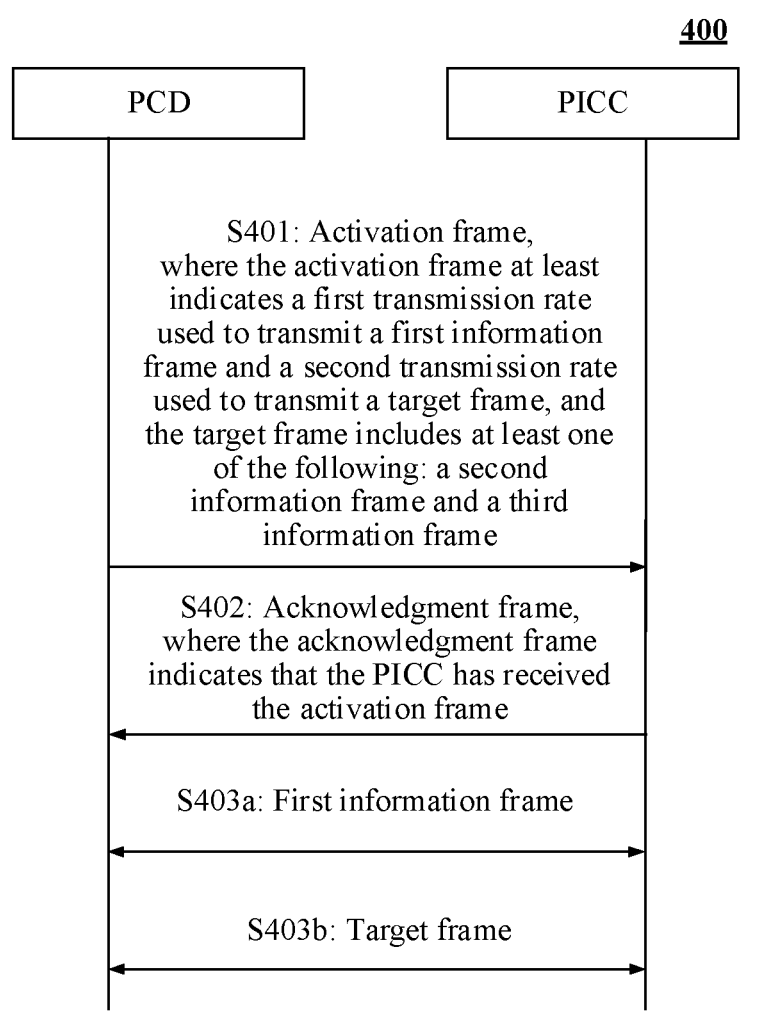

S401: Activation frame,
where the activation frame at least
indicates a first transmission rate
used to transmit a first information
frame and a second transmission rate
used to transmit a target frame, and
the target frame includes at least one
of the following: a second
information frame and a third
information frame S402: Acknowledgment frame,
where the acknowledgment frame
indicates that the PICC has received
the activation frame S403a: First information frame S403b: Target frame

FIG. 4A

First field

| b8 | b7 | b6 | b5 | b4 | b3 | b2 | b1 |
|----|----|----|----|----|----|----|----|
| 1  | 1  | 1  | 0  | 1  | 0  | 1  | 0  |

| b8 | b7 | b6 | b5 | b4 | b3 | b2 | b1 |
|----|----|----|----|----|----|----|----|
| 1  | 1  | 0  | 1  | 1  | 0  | 1  | 0  |

FIG. 4B

TRANSMISSION RATE DETERMINING METHOD AND COMMUNICATION APPARATUS

CROSS-REFERENCE TO RELATED APPLICATIONS

This is a continuation of International Patent Application No. PCT/CN2021/109342 filed on Jul. 29, 2021, the disclosure of which is hereby incorporated by reference in its entirety.

TECHNICAL FIELD

This application relates to the field of chip technologies, and in particular, to a transmission rate determining method and a communication apparatus.

BACKGROUND

The 14443 protocol of the International Organization for Standards (ISO)/International Electro-technical Commission (IEC) specifies a frame rate control process of near-field communication (NFC). For example, proximity coupling device (PCD) exchanges information with a proximity integrated circuit card (PICC) to negotiate a transmission rate, and then an information block (I-Block) frame, a receive ready block (R-Block) frame, and a supervisory block (S-Block) frame are transmitted at the negotiated transmission rate. The R-block frame is used to maintain a link between the PCD and the PICC. The S-block frame is used to negotiate the transmission rate between the PCD and the PICC.

However, when the PCD and the PICC cannot communicate with each other at the transmission rate due to a change of an external factor, for example, deterioration of air interface quality, the R-block frame and the S-block frame cannot be transmitted, and consequently the PCD loses a link exception recovery and frame rate negotiation control capability, and an unnecessary link disconnection occurs.

SUMMARY

This application provides a transmission rate determining method and a communication apparatus to improve link stability and reduce unnecessary link disconnections.

To achieve the foregoing objectives, the following technical solutions are used in embodiments of this application.

According to a first aspect, an embodiment of this application provides a transmission rate determining method. The method may be performed by a PCD, or may be performed by a chip applied to a PCD. The following uses an example in which an entity for executing the method is a PCD for description. The method includes that a PCD sends an activation frame to a PICC, where the activation frame indicates at least a first transmission rate used to transmit a first information frame and a second transmission rate used to transmit a target frame, the first information frame is used to transmit application information, the target frame includes at least one of a second information frame and a third information frame, the second information frame is used to transmit receive ready information, and the third information frame is used to transmit control information. Then, the PCD receives an acknowledgment frame from the PICC, where the acknowledgment frame indicates that the PICC has received the activation frame. Then, the PCD transmits the first information frame with the PICC at the first transmission rate, and transmits the target frame with the PICC at the second transmission rate.

In the transmission rate determining method in this embodiment of this application, the target frame includes the second information frame and the third information frame. The activation frame indicates the transmission rate of the first information frame and the transmission rate of the target frame, respectively. That is, the transmission rate of the first information frame and the transmission rate of the target frame are independent of each other, and are not affected by each other. Even if the first transmission rate that is of the first information frame and that is negotiated between the PCD and the PICC is high, a low transmission rate (that is, the second transmission rate) can still be used to transmit the target frame between the PCD and the PICC. When the target frame includes the second information frame, because the second information frame can transmit the receive ready information (for example, acknowledgment information or non-acknowledgment information), a link between the PCD and the PICC is maintained, thereby avoiding a link disconnection between the PCD and the PICC. When the target frame includes the third information frame, because the third information frame can transmit information about negotiating a transmission rate, the transmission rate of the first information frame can be re-negotiated between the PCD and the PICC such that the first information frame is switched to a lower rate for transmission, thereby avoiding a link disconnection.

In some embodiments, the activation frame further indicates that a status of an independent transmission rate adjustment function for the target frame is enabled, to explicitly indicate, to the PICC, that the transmission rate of the target frame is independent of the transmission rate of the first information frame.

In some embodiments, the activation frame is a bit rate activation frame.

In some embodiments, a type of the activation frame is an S-block containing parameters (S (PARAM)) frame to continue a rate negotiation process of the S (PARAM) frame. Therefore, compatibility is high, and signaling resource overheads are low.

In some embodiments, the transmission rate determining method in this embodiment of this application further includes that the PCD sends a request frame to the PICC, where the request frame requests a transmission rate supported by the PICC; and the PCD receives an indication frame from the PICC, where the indication frame indicates at least the transmission rate supported by the PICC, the transmission rate indicated by the indication frame includes a third transmission rate used to transmit the first information frame and a fourth transmission rate used to transmit the target frame, the third transmission rate is used to determine the first transmission rate, and the fourth transmission rate is used to determine the second transmission rate to prevent exceeding a device capability of the PICC.

In some embodiments, the indication frame is a bit rate indication frame.

In some embodiments, the indication frame further indicates that the PICC supports the independent transmission rate adjustment function for the target frame, to explicitly indicate, to the PCD, that the PICC supports the independent transmission rate adjustment function for the target frame.

In some embodiments, a type of the indication frame is an S (PARAM) frame, to continue a rate negotiation process of the S (PARAM) frame. Therefore, compatibility is high, and signaling resource overheads are low.

In some embodiments, a type of the activation frame is a S-block containing a rate S (RATE) frame. The S (RATE) frame is a frame type in the third information frame. In this case, the frame type of the third information frame is extended, and a rate negotiation process of the S (RATE) frame may continue to use the rate negotiation process of the S (PARAM) frame.

In some embodiments, the activation frame includes a first field, and the first field indicates that the type of the activation frame is the S (RATE) frame.

In some embodiments, a type of the indication frame is the S (RATE) frame.

In some embodiments, the indication frame includes a first field. The first field indicates that the type of the indication frame is the S (RATE) frame.

In some embodiments, the first field is a protocol control byte PCB field, and values of a second bit, a fifth bit, and a sixth bit in the PCB field are preset values. For example, the second bit is b2, and a value of b2 is 1. The fifth bit and the sixth bit are b6b5, and a value of b6b5 is (01)b or (10)b.

In some embodiments, the first transmission rate is equal to the second transmission rate. In other words, the target frame and the first information frame maintain a same transmission rate, to ensure that the target frame has high transmission efficiency.

In some embodiments, the first transmission rate is greater than the second transmission rate. That is, the transmission rate of the target frame is lower than the transmission rate of the first information frame, to ensure that the target frame can be successfully transmitted when air interface quality is poor.

In some embodiments, the first information frame includes an I-block frame, the second information frame includes a R-block frame, and the third information frame includes a S-block frame.

According to a second aspect, an embodiment of this application provides a transmission rate determining method. The method may be performed by a PICC, or may be performed by a chip applied to a PICC. The following uses an example in which an entity for executing the method is a PICC for description. The method includes that a PICC receives an activation frame from a proximity coupling device PCD, where the activation frame indicates at least a first transmission rate used to transmit a first information frame and a second transmission rate used to transmit a target frame, the first information frame is used to transmit application information, the target frame includes at least one of a second information frame and a third information frame, the second information frame is used to transmit receive ready information, and the third information frame is used to transmit control information, and the PICC sends an acknowledgment frame to the PCD. The acknowledgment frame indicates that the PICC has received the activation frame. The PICC transmits the first information frame with the PCD at the first transmission rate, and transmits the target frame with the PCD at the second transmission rate.

In a possible design, the transmission rate determining method in this embodiment of this application further includes that the PICC receives a request frame from the PCD. The request frame requests a transmission rate supported by the PICC. The PICC sends an indication frame to the PCD. The indication frame indicates at least the transmission rate supported by the PICC. The transmission rate indicated by the indication frame includes a third transmission rate used to transmit the first information frame and a fourth transmission rate used to transmit the target frame. The third transmission rate is used to determine the first transmission rate, and the fourth transmission rate is used to determine the second transmission rate.

In a possible design, the indication frame is a bit rate indication frame.

In a possible design, the indication frame further indicates that the PICC supports an independent transmission rate adjustment function for the target frame.

In a possible design, a type of the indication frame is an S (PARAM) frame.

In a possible design, a type of the indication frame is an S (RATE) frame.

In a possible design, the indication frame includes a first field. The first field indicates that the type of the indication frame is the S (RATE) frame.

In a possible design, a type of the activation frame is a S (RATE) frame.

In a possible design, the activation frame includes a first field. The first field indicates that the type of the activation frame is the S (RATE) frame.

In a possible design, the first field is a protocol control byte PCB field, and values of a second bit, a fifth bit, and a sixth bit in the PCB field are preset values.

In a possible design, the second transmission rate is less than or equal to the first transmission rate.

In a possible design, the first information frame includes an I-block frame, the second information frame includes a R-block frame, and the third information frame includes a S-block frame.

According to a third aspect, an embodiment of this application provides a communication apparatus. The communication apparatus may be the PCD in the first aspect or any one of the possible designs of the first aspect, or an apparatus disposed in the PCD, or a chip that implements a function of the PCD. The communication apparatus includes a corresponding module, unit, or means for implementing the foregoing method. The module, unit, or means may be implemented by hardware, software, or corresponding software executed by hardware. The hardware or the software includes one or more modules or units corresponding to the foregoing functions.

The PCD includes a processing module and a communication module. The processing module sends an activation frame to the PICC by using the communication module. The activation frame indicates at least a first transmission rate used to transmit a first information frame and a second transmission rate used to transmit a target frame. The first information frame is used to transmit application information. The target frame includes at least one of the following: a second information frame and a third information frame. The second information frame is used to transmit receive ready information, and the third information frame is used to transmit control information. The processing module receives an acknowledgment frame from the PICC by using the communication module. The acknowledgment frame indicates that the PICC has received the activation frame. The processing module controls the communication module to transmit the first information frame with the PICC at the first transmission rate, and transmit the target frame with the PICC at the second transmission rate.

In some embodiments, the activation frame further indicates that a status of the independent transmission rate adjustment function for the target frame is enabled.

In some embodiments, the activation frame is a bit rate activation frame.

In some embodiments, a type of the activation frame is a S (PARAM).

In some embodiments, the communication module is further configured to send a request frame to the PICC. The request frame requests a transmission rate supported by the PICC. The communication module is further configured to receive the indication frame from the PICC. The indication frame indicates at least the transmission rate supported by the PICC, the transmission rate indicated by the indication frame includes a third transmission rate used to transmit the first information frame and a fourth transmission rate used to transmit the target frame, the third transmission rate is used to determine the first transmission rate, and the fourth transmission rate is used to determine the second transmission rate.

In some embodiments, the indication frame is a bit rate indication frame.

In some embodiments, the indication frame further indicates that the PICC supports the independent transmission rate adjustment function for the target frame.

In some embodiments, a type of the indication frame is an S (PARAM) frame.

In some embodiments, a type of the activation frame is a S (RATE) frame.

In some embodiments, the activation frame includes a first field. The first field indicates that the type of the activation frame is the S (RATE) frame.

In some embodiments, a type of the indication frame is an S (RATE) frame.

In some embodiments, the indication frame includes a first field. The first field indicates that the type of the indication frame is the S (RATE) frame.

In some embodiments, the first field is a protocol control byte PCB field, and values of a second bit, a fifth bit, and a sixth bit in the PCB field are preset values. For example, the second bit is b2, and a value of b2 is 1. The fifth bit and the sixth bit are b6b5, and a value of b6b5 is (01)b or (10)b.

In some embodiments, the first transmission rate is equal to the second transmission rate.

In some embodiments, the first transmission rate is greater than the second transmission rate.

In some embodiments, the first information frame includes an I-block frame, the second information frame includes a R-block frame, and the third information frame includes a S-block frame.

According to a fourth aspect, an embodiment of this application provides a communication apparatus. The communication apparatus may be the PICC in the second aspect or any one of the possible designs of the second aspect, or an apparatus disposed in the PICC, or a chip that implements a function of the PICC. The communication apparatus includes a corresponding module, unit, or means for implementing the foregoing method. The module, unit, or means may be implemented by hardware, software, or corresponding software executed by hardware. The hardware or the software includes one or more modules or units corresponding to the foregoing functions.

The PICC includes a processing module and a communication module. The processing module receives an activation frame from a PCD by using the communication module. The activation frame indicates at least a first transmission rate used to transmit a first information frame and a second transmission rate used to transmit a target frame, and the first information frame is used to transmit application information. The target frame includes at least one of a second information frame and a third information frame. The second information frame is used to transmit receive ready information, and the third information frame is used to transmit control information. The processing module sends an acknowledgment frame to the PCD by using the communication module. The acknowledgment frame indicates that the communication apparatus has received the activation frame. The processing module controls the communication module to transmit the first information frame with the PCD at the first transmission rate, and transmit the target frame with the PCD at the second transmission rate.

In a possible design, the communication module is further configured to receive a request frame from the PCD. The request frame requests a transmission rate supported by the communication apparatus. The communication module is further configured to send an indication frame to the PCD. The indication frame indicates at least the transmission rate supported by the communication apparatus. The transmission rate indicated by the indication frame includes a third transmission rate used to transmit the first information frame and a fourth transmission rate used to transmit the target frame. The third transmission rate is used to determine the first transmission rate, and the fourth transmission rate is used to determine the second transmission rate.

In a possible design, the indication frame is a bit rate indication frame.

In a possible design, the indication frame further indicates that the communication apparatus supports an independent transmission rate adjustment function for the target frame, and the function indicated by the indication frame is used to determine the second transmission rate.

In a possible design, a type of the indication frame is an S (PARAM) frame.

In a possible design, a type of the indication frame is an S (RATE) frame.

In a possible design, the indication frame includes a first field. The first field indicates that the type of the indication frame is the S (RATE) frame.

In a possible design, a type of the activation frame is a S (RATE) frame.

In a possible design, the activation frame includes a first field. The first field indicates that the type of the activation frame is the S (RATE) frame.

In a possible design, the first field is a protocol control byte PCB field, and values of a second bit, a fifth bit, and a sixth bit in the PCB field are preset values.

In a possible design, the second transmission rate is less than or equal to the first transmission rate.

In a possible design, the first information frame includes an I-block frame, the second information frame includes a R-block frame, and the third information frame includes a S-block frame.

According to a fifth aspect, an embodiment of this application provides a communication apparatus, including a processor and a memory. The memory is configured to store computer instructions. When the processor executes the instructions, the communication apparatus is enabled to perform the method performed by the PCD in any one of the foregoing aspects or any possible design of any one of the foregoing aspects. The communication apparatus may be the PCD in the first aspect or any one of the possible designs of the first aspect, or a chip that implements a function of the PCD.

According to a sixth aspect, an embodiment of this application provides a communication apparatus, including a processor. The processor is coupled to a memory, and is configured to read and execute instructions in the memory such that the communication apparatus performs the method performed by the PCD in any one of the foregoing aspects or any possible design of any one of the foregoing aspects. The communication apparatus may be the PCD in the first aspect or any one of the possible designs of the first aspect, or a chip that implements a function of the PCD.

According to a seventh aspect, an embodiment of this application provides a communication apparatus, including a logic circuit and an input/output interface. The input/output interface is configured to communicate with a module outside the chip. For example, the chip may be a chip that implements a function of the PCD in the first aspect or any one of the possible designs of the first aspect. The input/output interface outputs an activation frame, a first information frame, a second information frame, and a third information frame, or the input/output interface inputs an acknowledgment frame, a first information frame, a second information frame, and a third information frame. The logic circuit is configured to implement the method in the first aspect or any one of the possible designs of the first aspect.

According to an eighth aspect, an embodiment of this application provides a communication apparatus, including a processor and a memory. The memory is configured to store computer instructions. When the processor executes the instructions, the communication apparatus is enabled to perform the method performed by the PICC in any one of the foregoing aspects or any possible design of any one of the foregoing aspects. The communication apparatus may be the PICC in the second aspect or any one of the possible designs of the second aspect, or a chip that implements a function of the PICC.

According to a ninth aspect, an embodiment of this application provides a communication apparatus, including a processor. The processor is coupled to a memory, and is configured to read and execute instructions in the memory such that the communication apparatus performs the method performed by the PICC in any one of the foregoing aspects or any possible design of any one of the foregoing aspects. The communication apparatus may be the PICC in the second aspect or any one of the possible designs of the second aspect, or a chip that implements a function of the PICC.

According to a tenth aspect, an embodiment of this application provides a communication apparatus including a logic circuit and an input/output interface. The input/output interface is configured to communicate with a module outside the chip. For example, the chip may be a chip that implements a function of the PICC in the second aspect or any one of the possible designs of the second aspect. The input/output interface inputs an activation frame, a first information frame, a second information frame, and a third information frame, or the input/output interface outputs an acknowledgment frame, a first information frame, a second information frame, and a third information frame. The logic circuit is configured to implement the method in the second aspect or any one of the possible designs of the second aspect.

According to an eleventh aspect, an embodiment of this application provides a computer-readable storage medium. The computer-readable storage medium stores instructions, and when the instructions are run on a computer, the computer is enabled to perform the communication method in any one of the foregoing aspects.

According to a twelfth aspect, an embodiment of this application provides a computer program product including instructions. When the computer program product runs on a computer, the computer is enabled to perform the communication method in any one of the foregoing aspects.

According to a thirteenth aspect, an embodiment of this application provides a circuit system, where the circuit system includes a logic circuit, and the logic circuit is configured to perform the method according to any one of the foregoing aspects.

According to a fourteenth aspect, an embodiment of this application provides a communication system. The communication system includes the PCD and the PICC in any one of the foregoing aspects.

For technical effects brought by any design in the second aspect to the fourteenth aspect, refer to beneficial effects in the corresponding method provided above. Details are not described herein again.

BRIEF DESCRIPTION OF DRAWINGS

FIG. 4A is a schematic flowchart of still another transmission rate determining method according to an embodiment of this application;

FIG. 4B is a schematic diagram of a structure of a first field according to an embodiment of this application;

DESCRIPTION OF EMBODIMENTS

In the specification and accompanying drawings of this application, the terms "first", "second", and the like are intended to distinguish between different objects or distinguish between different processing of a same object, but do not indicate a particular order of the objects. In addition, the terms "including", "having", or any other variant thereof in descriptions of this application are intended to cover a non-exclusive inclusion. For example, a process, a method, a system, a product, or a device that includes a series of steps or units is not limited to the listed steps or units, but optionally further includes other unlisted steps or units, or optionally further includes another inherent step or unit of the process, the method, the product, or the device. In embodiments of this application, "a plurality of" includes two or more. In embodiments of this application, the word "example" or "for example" or the like is used to represent giving an example, an illustration, or a description. Any embodiment or design scheme described as an "example" or "for example" in embodiments of this application should not be explained as being more preferred or having more advantages than another embodiment or design scheme. Exactly, use of the word "example", "for example", or the like is intended to present a related concept in a specific manner. In embodiments of this application, "transmission" may include "sending" or "receiving" depending on a specific situation, and may further include sending and receiving. That an X frame includes at least one of A and B may be that the X frame includes A, or that the X frame includes B, or that the X frame includes A and B.

Technical terms used in this application are first described.

1. NFC

NFC is a short-distance high-frequency wireless communication technology. Non-contact point-to-point data exchange can be performed between devices that support the NFC. The NFC may alternatively be referred to as short-distance wireless communication.

2. PCD and PICC

The PCD is an active device in NFC communication, and is configured to generate and provide a radio frequency (RF) field. The radio frequency field is used to send an RF carrier of a specific frequency (for example, 13.56 megahertz (MHz)). The PCD may alternatively be referred to as a coupling apparatus, a card reader, a contactless card reader, a proximity coupling device, or the like.

The PICC is a passive device in NFC communication, and is configured to detect a radio frequency field and perform data receiving and sending by using a load modulation technology. The PICC may alternatively be referred to as a card, a sensing card, a sensing entity, or the like.

Figures 1, 2:
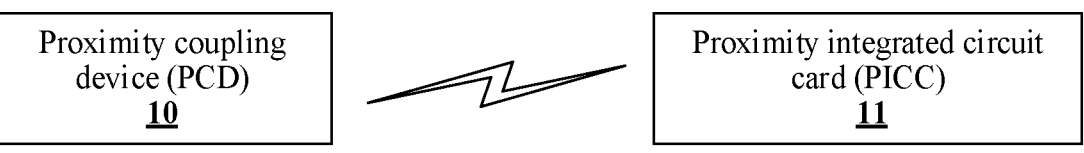
FIG. 1 is a schematic diagram of a network architecture according to an embodiment of this application.
FIG. 2 is a schematic diagram of a structure of a block format of a communication protocol stack according to an embodiment of this application.

The PCD and the PICC may communicate with each other by using a high-frequency signal within a short distance. For example, FIG. 1 shows a network architecture to which an embodiment of this application is applicable. In FIG. 1, information exchange is performed between a proximity coupling device 10 and a proximity integrated circuit card 11 by using an RF carrier of 13.56 MHz.

3. Frame and Block

A frame is a sequence of data bits and optional error detection bits. It has delimiters at the beginning and the end.

A block is a special type of frame that contains a valid protocol data format. The valid protocol data format includes an I-block, a R-block, and a S-block.

The I-block transmits information used by an application layer. The I-block may alternatively be described as a transmission information block, a transmission information frame, an I-block, an I block, an I frame, or an I-block frame. In this embodiment of this application, an I-block frame is used as an example for description. Information used by the application layer may alternatively be described as application information. In this embodiment of this application, application information is used as an example for description.

The R-block transmits receive ready information, such as acknowledgment information or non-acknowledgement information. An R-block transmitting the acknowledgment information is denoted as an R-block containing a positive acknowledge (R (ACK)), and an R-block transmitting the non-acknowledgment information is denoted as an R-block containing a negative acknowledge (R (NAK)). The R-block may alternatively be described as a transmission acknowledgment block, a transmission acknowledgment frame, an R-block, an R-block, an R-frame, or an R-block frame. In this embodiment of this application, an R-block frame is used as an example for description.

The S-block is used to exchange control information between the PCD and the PICC. Frame types of the S-block include an S (PARAM), S-block waiting time extension (S (WTX)) containing an information (INF) field, and a DESE- LECT that does not contain the INF field. The S (PARAM) frame includes at least one of a bit rate request frame, a bit rate indication frame, a bit rate activation frame, and a bit rate acknowledgment frame. The S-block may alternatively be described as a transmission control block, a transmission control frame, an S-block, an S block, an S frame, or an S-block frame. In this embodiment of this application, an S-block frame is used as an example for description.

Refer to FIG. 2. FIG. 2 shows a block format. A block includes a start field and an ending field.

The start field includes a protocol control byte (PCB). The PCB includes b1 to b8, and the PCB indicates three different block formats. For example, when a value of b8b7 is (00)b, that is, values of bits corresponding to b8 and b7 are both 0, a block in which the PCB is located is an I-block frame. When a value of b8b7 is (10)b, that is, a value of a bit corresponding to b8 is 1, and a value of a bit corresponding to b7 is 0, a block in which the PCB is located is an R-block frame. When a value of b8b7 is (11)b, that is, values of bits corresponding to b8 and b7 are 1, a block in which the PCB is located is an S-block frame. When a value of b8b7 is (11)b, a value of b2 is (0)b, and a value of b6b5 is (11)b, a block in which the PCB is located is an S (PARAM). When a value of b8b7 is (11)b, a value of b2 is (1)b, and a value of b6b5 is (00)b, a block in which the PCB is located is a DESELECT. When a value of b8b7 is (11)b, a value of b2 is (1)b, and a value of b6b5 is (11)b, a block in which the PCB is located is an S (WTX). In addition, values of b1 and b3 may both be (0)b. A value of b4 may be (1)b, indicating that there is a card identifier (CID) after the byte. Optionally, the start field further includes one of the following: a CID and a node address (NAD). The information field includes an information (INF) field.

The end field includes error-detection-and-correction (EDC) code.

Optionally, the block further includes the information field. The information field includes at least one of application information in the I-block frame, non-application information in the I-block frame, and status information in the S-block frame.

4. ISO/IEC 14443 Protocol

The ISO/IEC 14443 protocol is a branch of the NFC protocol. The ISO/IEC 14443 protocol defines a plurality of transmission rates to meet different service requirements. For example, in the ISO/IEC 14443 protocol, a transmission rate may be 106 kilobits per second (Kbps), or may be 27.12 megabits per second (Mbps). In addition, the ISO/IEC 14443 protocol further specifies an S (PARAM) frame used by the PCD to initiate negotiation and change a transmission rate in a data transmission phase. A specific process is shown in FIG. 3A.

S1: A PCD and a PICC execute an anti-collision and link establishment process.

The anti-collision and link establishment process specifies a transmission rate during communication between the PCD and the PICC. After the anti-collision and link establishment process, a communication link between the PCD and the PICC is established, and information exchange is performed at the transmission rate specified in the anti-collision and link establishment process.

Figure 3A:
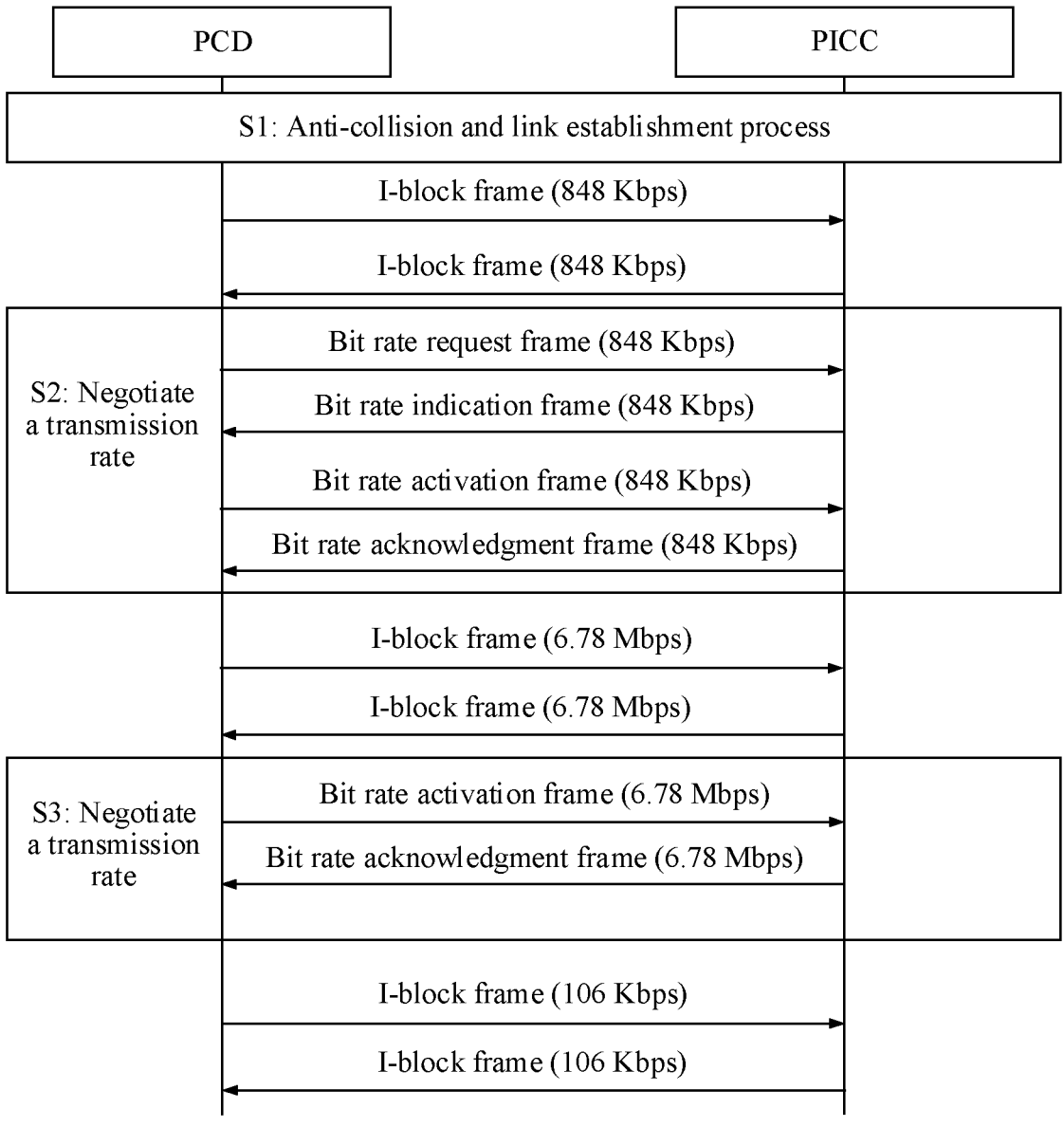
FIG. 3A is a schematic flowchart of a transmission rate determining method according to an embodiment of this application.

For example, as shown in FIG. 3A, after the link is established, a rate at which an I-block frame is transmitted from the PCD to the PICC and a rate at which the I-block frame is transmitted from the PICC to the PCD are both 848 Kbps.

If the PCD and the PICC are not affected by external factors (such as air interface quality, aging of the PCD, and aging of the PICC), the PCD and the PICC perform S2.

S2: The PCD and the PICC negotiate a transmission rate. For example, S2 includes the following four steps.

Step 1: The PCD sends a bit rate request frame to the PICC. Correspondingly, the PICC receives the bit rate request frame from the PCD.

The bit rate request frame requests a transmission rate supported by the PICC.

Step 2: The PICC sends a bit rate indication frame to the PCD. Correspondingly, the PCD receives the bit rate indication frame from the PICC.

The bit rate indication frame is used to respond to the bit rate request frame. The bit rate indication frame indicates that a maximum transmission rate supported by the PICC is 6.78 Mbps, and the transmission rate indicated by the bit rate indication frame includes a transmission rate from the PCD to the PICC and a transmission rate from the PICC to the PCD. That is, the PICC supports a maximum transmission rate of 6.78 Mbps from the PCD to the PICC. In addition, the PICC supports a maximum transmission rate of 6.78 Mbps from the PICC to the PCD.

Step 3: The PCD sends a bit rate activation frame to the PICC. Correspondingly, the PICC receives the bit rate activation frame from the PCD.

The bit rate activation frame indicates that a transmission rate from the PCD to the PICC is 6.78 Mbps, and a transmission rate from the PICC to the PCD is 6.78 Mbps.

Step 4: The PICC sends a bit rate acknowledgment frame to the PCD. Correspondingly, the PCD receives the bit rate acknowledgment frame from the PICC.

The bit rate acknowledgment frame is used to respond to the bit rate activation frame. The bit rate acknowledgment frame indicates that the PICC has received the bit rate activation frame.

It should be noted that the frames transmitted in the foregoing four steps are all S (PARAM) frames, and the transmission rate is determined by using the anti-collision and link establishment process. As shown in FIG. 3A, frame rates in the foregoing four steps are 848 Kbps. Table 1 shows some fields of the foregoing four frames in the information field.

TABLE 1

| Tag | Description | Length | | | Value |
|-----|-------------|--------|-----|-----|-------|
| 'A1' | Bit rate request frame | '0' | | | / |
| 'A2' | Bit rate indication frame | 'L' | Tag | Length | Value |
| | | | '80' | '02' | Supported bit rate from the PCD to the PICC |
| | | | '81' | '02' | Supported bit rate from the PICC to the PCD |
| | | | '82' | '01' | Supported framing option from the PICC to the PCD |
| 'A3' | Bit rate activation frame | 'L' | Tag | Length | Value |
| | | | '83' | '02' | Selected bit rate from the PCD to the PICC |
| | | | '84' | '02' | Selected bit rate from the PICC to the PCD |
| | | | '85' | '01' | Selected framing option from the PICC to the PCD |
| 'A4' | Bit rate acknowledgment frame | / | | | / |

It can be learned from Table 1 that the information field of the S (PARAM) frame includes at least the following bytes: a tag byte and a length byte. When the tag byte indicates "80", content carried in the frame in which the byte is located includes a supported bit rate from the PCD to the PICC. A value indicated by the length byte is "02", that is, the information "supported bit rate from the PCD to the PICC" occupies two bytes. A case in which the tag byte indicates "81", "82", "83", "84", or "85" may be deduced by analogy. When the tag byte indicates "A1", the frame in which the tag byte is located is a bit rate request frame. The frame in which the byte is located does not carry other content. The value indicated by the length byte is "0". When the tag byte indicates "A2", the frame in which the tag byte is located is a bit rate indication frame. The frame in which the byte is located carries other content (for example, content corresponding to tags "80", "81", and "82"). The value indicated by the length byte is "L", that is, "the frame in which the byte is located carries other content" occupies L bytes in total. For example, when the bit rate indication frame carries content corresponding to the tags "80" and "81" (that is, the bit rate indication frame carries "supported bit rate from the PCD to the PICC" and "supported bit rate from the PICC to the PCD"), a value of L is 8. The tag '80' occupies one byte, a length '02' corresponding to the tag '80' occupies one byte, and the information "supported bit rate from the PCD to the PICC" occupies two bytes. The tag '81' occupies one byte, a length '02' corresponding to the tag '81' occupies one byte, and the information "supported bit rate from the PICC to the PCD" occupies two bytes. When the bit rate indication frame carries the content corresponding to the tags "80", "81", and "82" (that is, the bit rate indication frame carries "supported bit rate from the PCD to the PICC", "supported bit rate from the PICC to the PCD", and "supported framing option from the PICC to the PCD"), the value of L is 11. The tag '80' occupies one byte, the length '02' corresponding to the tag '80' occupies one byte, and the information "supported bit rate from the PCD to the PICC" occupies two bytes. The tag '81' occupies one byte, the length '02' corresponding to the tag '81' occupies one byte, and the information "supported bit rate from the PICC to the PCD" occupies two bytes. The tag '82' occupies one byte, a length '01' corresponding to the tag '82' occupies one byte, and the information "supported framing option from the PICC to the PCD" occupies one byte. A case in which the tag byte indicates "A3" or "A4" may be deduced by analogy, and details are not described herein again.

For example, as shown in FIG. 3A, after S2, a rate at which the I-block frame is transmitted from the PCD to the PICC and a rate at which the I-block frame is transmitted from the PICC to the PCD are both 6.78 Mbps.

The transmission rate between the PCD and the PICC cannot be maintained due to external factors (such as poor air interface quality, aging of the PCD, and aging of the PICC). In this case, the PCD and the PICC perform S3.

S3: The PCD and the PICC negotiate a transmission rate. For example, an implementation process of S3 includes the following two steps.

Step 1: The PCD sends a bit rate activation frame to the PICC. Correspondingly, the PICC receives the bit rate activation frame from the PCD.

The bit rate activation frame indicates that a transmission rate from the PCD to the PICC is 106 Kbps, and a transmission rate from the PICC to the PCD is 106 Kbps.

Step 2: The PICC sends a bit rate acknowledgment frame to the PCD. Correspondingly, the PCD receives the bit rate acknowledgment frame from the PICC.

The bit rate acknowledgment frame indicates that the PICC has received the bit rate activation frame.

For example, as shown in FIG. 3A, after S3, the rate at which the I-block frame is transmitted from the PCD to the PICC and the rate at which the I-block frame is transmitted from the PICC to the PCD are both 106 kbps.

It should be noted that the frame rate in S3 is equal to the transmission rate negotiated in S2, that is, the transmission rate of the bit rate activation frame and the bit rate acknowledgment frame is 6.78 Mbps, which is the same as the transmission rate of the I-block frame, as shown in FIG. 3A.

It can be learned from the foregoing process that the transmission rate negotiated by using the S (PARAM) frame forcibly affects the transmission rates of the R-block frame and the S-block frame. The R-block frame is used to transmit acknowledgment information or non-acknowledgement information for data response and exception recovery, thereby maintaining link continuity. The S-block frame is used to transmit control information such that a new transmission rate can be negotiated between the PCD and the PICC. When an external factor changes, for example, the quality of the air interface deteriorates, the PCD and the PICC cannot communicate with each other at the transmission rate, and the R-block frame and the S-block frame cannot be transmitted.

Figure 3B:
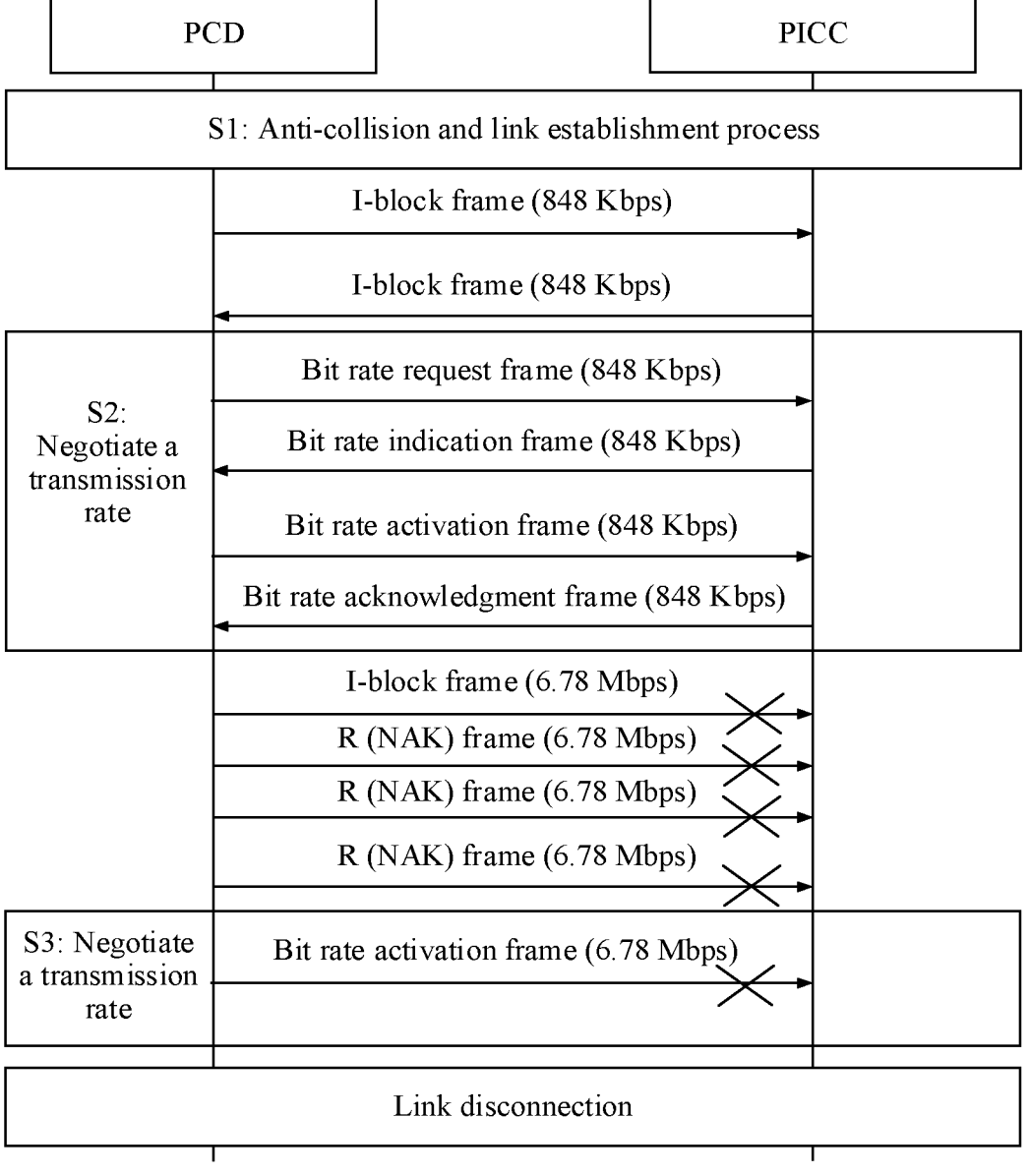
FIG. 3B is a schematic flowchart of another transmission rate determining method according to an embodiment of this application.

As shown in FIG. 3B, an example in which the transmission rates of the I-block frame, the R-block frame, and the S-block frame are all 6.78 Mbps is used. When the air interface quality deteriorates, the PCD sends the I-block frame to the PICC at the transmission rate of 6.78 Mbps, but the PICC cannot receive the I-block frame from the PCD. Similarly, the PCD sends an R (NAK) frame to the PICC at a transmission rate of 6.78 Mbps, and the PICC cannot receive the R (NAK) frame from the PCD such that a link between the PCD and the PICC cannot be maintained. Even if the PCD performs S3, that is, the PCD sends the bit rate activation frame to the PICC, because the transmission rate of the bit rate activation frame is 6.78 Mbps, the current air interface quality cannot reach the transmission rate, and the PICC cannot receive the bit rate activation frame from the PCD. As a result, the PCD and the PICC cannot negotiate the transmission rate. In other words, the PCD loses a capability of controlling link exception recovery and rate negotiation, and therefore, an unnecessary link disconnection occurs.

In view of this, an embodiment of this application provides a transmission rate determining method, to improve link stability and reduce unnecessary link disconnections. A core idea of the transmission rate determining method in this embodiment of this application is as follows. A PCD sends an activation frame to a PICC. The activation frame indicates at least a first transmission rate used to transmit a first information frame and a second transmission rate used to transmit a target frame. The first information frame is used to transmit application information. The target frame includes at least one of the following: a second information frame and a third information frame. The second information frame is used to transmit receive ready information, and the third information frame is used to transmit control information. In this way, the transmission rate of the first information frame and the transmission rate of the target frame are independent of each other. After the PCD receives the acknowledgment frame from the PICC, the PCD transmits the first information frame with the PICC at the first transmission rate, and transmits the target frame with the PICC at the second transmission rate. In this way, even if the air interface quality deteriorates and transmission of the first information frame is affected, the target frame can still be normally transmitted because the transmission rate of the target frame is different from the transmission rate of the first information frame, thereby maintaining a link between the PCD and the PICC, and reducing unnecessary link disconnections.

The following describes in detail a transmission rate determining method 400 in an embodiment of this application with reference to FIG. 1 and FIG. 4A.

S401: A PCD sends an activation frame to a PICC. Correspondingly, the PICC receives the activation frame from the PCD.

The activation frame indicates at least a first transmission rate used to transmit a first information frame and a second transmission rate used to transmit a target frame.

For example, the activation frame is described as follows.

The activation frame may be a bit rate activation frame, as described in FIG. 3A. Certainly, the activation frame may have another name. This is not limited in this embodiment of this application. In this embodiment of this application, an activation frame is used as an example for description.

A type of the activation frame may be an S (PARAM) frame. In other words, in a PCB byte of the activation frame, a value of b8b7 is (11)b. In this case, a field of the S (PARAM) frame is extended, and an interaction process between the PCD and the PICC may be a rate negotiation process shown in FIG. 3A, without additional signaling overheads, and compatibility is high.

The type of the activation frame may alternatively be a supervisory block S (RATE) frame containing a rate. In this case, a frame type of a third information frame (for example, an S-block frame) is extended, and for a rate negotiation process of the S (RATE) frame, refer to the process shown in FIG. 3A.

For example, the activation frame includes a first field. The first field indicates that a frame type of a frame in which the field is located is the S (RATE) frame. The first field may be a PCB, and values of a second bit, a fifth bit, and a sixth bit in the PCB are preset values, that is, a value of b2 is 1, a value of b6b5 is (01)b or (10)b, and a value of b8b7 is (11)b, as shown in FIG. 4B. For values of other bits in the first field, refer to descriptions in FIG. 4B or FIG. 2. Details are not described herein again. It should be understood that, in this embodiment of this application, only a name of an S (RATE) frame is used as an example for description, and a frame type extended from the third information frame (for example, the S-block frame) may alternatively have another name. This is not limited in this embodiment of this application.

For example, the activation frame includes first indication information and second indication information. The first indication information indicates the first transmission rate used to transmit the first information frame, and the second indication information indicates the second transmission rate used to transmit the target frame. The target frame includes at least one of the following: a second information frame and the third information frame. For example, the target frame includes the second information frame, or the target frame includes the third information frame, or the target frame includes the second information frame and the third information frame.

The first information frame is used to transmit application information. For example, the first information frame includes an I-block frame.

The second information frame is used to transmit receive ready information. For example, the second information frame includes an R-block frame.

The third information frame is used to transmit control information. For example, the third information frame includes an S-block frame.

For example, the target frame includes the second information frame, but does not include the third information frame. In this case, the second transmission rate is a rate used to transmit the second information frame. For another example, the target frame includes the third information frame, but does not include the second information frame. In this case, the second transmission rate is a rate used to transmit the third information frame. For another example, the target frame includes the second information frame and the third information frame. In this case, the second transmission rate is a rate used to transmit the second information frame and a rate used to transmit the third information frame. In other words, the target frame does not include the first information frame. In this way, the second transmission rate of the target frame and the first transmission rate of the first information frame are independent of each other. The second transmission rate of the target frame may be the same as or different from the first transmission rate of the first information frame. For example, the second transmission rate is less than the first transmission rate. When the first transmission rate is equal to the second transmission rate, the target frame and the first information frame maintain a same transmission rate, to ensure that the target frame has high transmission efficiency. When the first transmission rate is greater than the second transmission rate, the transmission rate of the target frame is lower than the transmission rate of the first information frame, to ensure that the target frame can be successfully transmitted when air interface quality is poor.

In some embodiments, an example in which the activation frame is implemented as a bit rate activation frame is used. A bearer status of the first indication information in the bit rate activation frame is as follows: The first indication information includes content indicated by the tag '83' in Table 1, that is, the first indication information includes the bit rate from the PCD to the PICC of the I-block frame. Alternatively, the first indication information includes content indicated by the tag '84' in Table 1, that is, the first indication information includes the bit rate from the PICC to the PCD of the I-block frame. Alternatively, the first indication information includes content indicated by tags '83' and '84' in Table 1. The second indication information is carried in an extension field of the bit rate activation frame. For example, the target frame includes the second information frame and the third information frame. The second indication information includes content indicated by the tag 'x4' in Table 2, that is, the second indication information includes a selected independent bit rate from the PCD to the PICC of the R-block frame and the S-block frame. Alternatively, the second indication information includes content indicated by the tag 'x5' in Table 2, that is, the second indication information includes selected independent bit rates from the PICC to the PCD of the R-block frame and the S-block frame. Alternatively, the second indication information includes content indicated by tags 'x4' and 'x5' in Table 2.

For example, Table 2 shows an indication status of a tag byte and a length byte by using an example in which the target frame includes the R-block frame and the S-block frame.

TABLE 2

| Tag | Description | Length | | | Value |
|---|---|---|---|---|---|
| 'A2' | Bit rate indication frame | 'K' | Tag 'x1' | Length '02' | Value Supported R-block and S-block independent bit rates from the PCD to the PICC |
| | | | 'x2' | '02' | Supported R-block and S-block independent bit rates from the PICC to the PCD |
| | | | 'x3' | '01' | Supported framing R-block and S-block independent rates |
| 'A3' | Bit rate activation frame | 'K' | Tag 'x4' | Length '02' | Value Selected R-block and S-block independent bit rates from the PCD to the PICC |
| | | | 'x5' | '02' | Selected R-block and S-block independent bit rates from the PICC to the PCD |
| | | | 'x6' | '01' | Selected framing R-block and S-block independent rates |

It can be learned from Table 2 that, when the tag byte indicates "x1", content carried in a frame in which the byte is located includes: supported independent bit rates of the R-block frame and the S-block frame from the PCD to the PICC. The value indicated by the length byte is "02", that is, the information "supported independent bit rates of the R-block frame and the S-block frame from the PCD to the PICC" occupies two bytes. A case in which the tag byte indicates "x2", "x3", "x4", "x5", or "x6" may be deduced by analogy. When the tag byte indicates "A2", the frame in which the tag byte is located is a bit rate indication frame. The frame in which the byte is located carries other content (for example, content corresponding to the tags "x1", "x2", and "x3"). A value indicated by the length byte is "K", that is, "the frame in which the byte is located carries other content" occupies K bytes in total. For example, when the bit rate indication frame carries content corresponding to the tags "x1" and "x2", a value of K is 8. The tag 'x1' occupies one byte, a length '02' corresponding to the tag 'x1' occupies one byte, and the information "supported R-block and S-block independent bit rates from the PCD to the PICC" occupies two bytes. The tag 'x2' occupies one byte, the length '02' corresponding to the tag 'x2' occupies one byte, and the information "supported R-block and S-block independent bit rates from the PICC to the PCD" occupies two bytes. When the bit rate indication frame carries content corresponding to the tags "x1", "x2", and "x3", a value of K is 11. The tag 'x1' occupies one byte, the length '02' corresponding to the tag 'x1' occupies one byte, and the information "supported R-block and S-block independent bit rates from the PCD to the PICC" occupies two bytes. The tag 'x2' occupies one byte, the length '02' corresponding to the tag 'x2' occupies one byte, and the information "supported R-block and S-block independent bit rates from the PICC to the PCD" occupies two bytes. The tag 'x3' occupies one byte, the length '01' corresponding to the tag 'x3' occupies one byte, and the information "supported framing R-block and S-block independent rates" occupies one byte. A case in which the tag byte indicates "A3" may be deduced by analogy, and details are not described herein again.

It should be understood that, in Table 2, x1 to x6 are identifiers different from existing tags. For example, values of x1 to x6 may be 1 to 6, or may be other values, letters, symbols, or the like. This is not limited in this embodiment of this application.

In some embodiments, the activation frame further indicates that a status of an independent transmission rate adjustment function for the target frame is enabled. For example, the activation frame further includes third indication information. The third indication information indicates that the status of the independent transmission rate adjustment function for the target frame is enabled. In other words, the third indication information indicates to enable the independent transmission rate adjustment function for the target frame.

For example, the third indication information is carried in an extension field of the bit rate activation frame. Table 2 is still used as an example. When the target frame is the R-block frame and the S-block frame, the third indication information includes content indicated by the tag 'x6' in Table 2, that is, the third indication information includes selected independent rates of the R-block frame and the S-block frame. The third indication information and the second indication information may be carried in a same bit rate activation frame, or may be carried in different bit rate activation frames.

It should be noted that when the activation frame does not carry the third indication information, the PICC may determine, based on the first indication information and the second indication information, that the transmission rate of the first information frame and the transmission rate of the target frame are independent of each other. On the contrary, when the activation frame carries the third indication information, the PCD explicitly indicates, to the PICC, that the transmission rate of the first information frame and the transmission rate of the target frame are independent of each other such that the PICC separately determines the transmission rates of the first information frame and the target frame.

S402: The PICC sends an acknowledgment frame to the PCD. Correspondingly, the PCD receives the acknowledgment frame from the PICC.

The acknowledgment frame indicates that the PICC has received the activation frame. For example, the acknowledgment frame may be a bit rate acknowledgment frame, as described in FIG. 3A. Certainly, the acknowledgment frame may have another name. This is not limited in this embodiment of this application. In this embodiment of this application, an acknowledgment frame is used as an example for description.

S403a: The PCD and the PICC transmit the first information frame at the first transmission rate.

For example, the first transmission rate is 6.78 Mbps. The PCD sends an I-block frame to the PICC at the transmission rate of 6.78 Mbps. Alternatively, the PICC sends an I-block frame to the PCD at the transmission rate of 6.78 Mbps.

S403b: The PCD and the PICC transmit the target frame at the second transmission rate.

For example, the first transmission rate is 106 Kbps. For example, the PCD sends the R-block frame to the PICC at the transmission rate of 106 Kbps. Alternatively, the PICC sends the R-block frame to the PCD at the transmission rate of 106 Kbps. For another example, the PCD sends the S-block frame to the PICC at the transmission rate of 106 Kbps. Alternatively, the PICC sends the S-block frame to the PCD at the transmission rate of 106 Kbps.

It should be understood that the PCD may first perform S403a and then perform S403b, or may first perform S403b and then perform S403a, or may simultaneously perform S403a and S403b. This is not limited in this embodiment of this application.

In the transmission rate determining method 400 in this embodiment of this application, the target frame includes the second information frame and the third information frame. The activation frame indicates the transmission rate of the first information frame and the transmission rate of the target frame, respectively. That is, the transmission rate of the first information frame and the transmission rate of the target frame are independent of each other, and are not affected by each other. Even if the first transmission rate that is of the first information frame and that is negotiated between the PCD and the PICC is high, a low transmission rate (that is, the second transmission rate) can still be used to transmit the target frame between the PCD and the PICC. When the target frame includes the second information frame, because the second information frame can transmit the receive ready information (for example, acknowledgment information or non-acknowledgment information), a link between the PCD and the PICC is maintained, thereby avoiding a link disconnection between the PCD and the PICC. When the target frame includes the third information frame, because the third information frame can transmit information about negotiating a transmission rate, the transmission rate of the first information frame can be re-negotiated between the PCD and the PICC, so that the first information frame is switched to a low rate for transmission, thereby avoiding a link disconnection.

Figure 5:
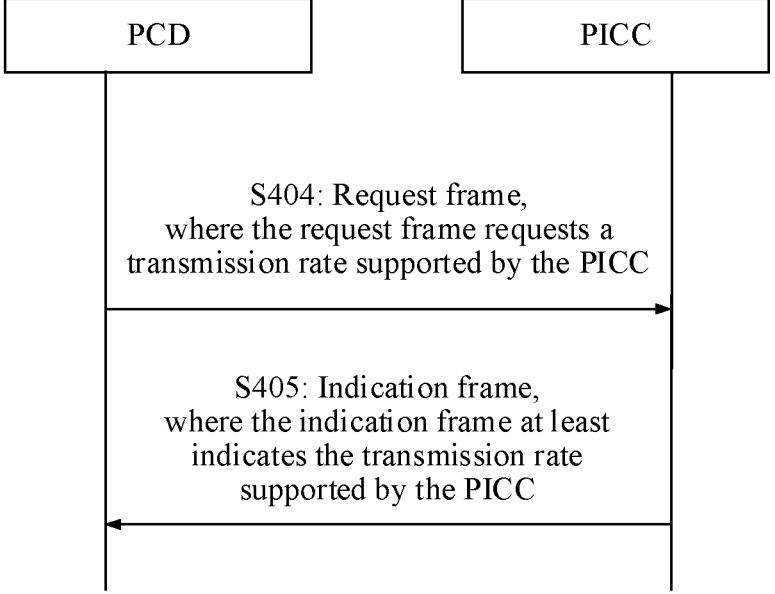
FIG. 5 is a schematic flowchart of yet another transmission rate determining method according to an embodiment of this application.

Refer to FIG. 5. In some embodiments, the transmission rate determining method 400 in this embodiment of this application further includes S404 and S405.

S404: The PCD sends a request frame to the PICC. Correspondingly, the PICC receives the request frame from the PCD.

The request frame requests a transmission rate supported by the PICC. For example, the request frame may be a bit rate request frame, as described in FIG. 3A. Certainly, the request frame may have another name. This is not limited in this embodiment of this application. In this embodiment of this application, a request frame is used as an example for description.

S405: The PICC sends an indication frame to the PCD. Correspondingly, the PCD receives the indication frame from the PICC.

The indication frame indicates at least the transmission rate supported by the PICC. The transmission rate indicated by the indication frame includes a third transmission rate used to transmit the first information frame and a fourth transmission rate used to transmit the target frame. The third transmission rate is used to determine the first transmission rate, and the fourth transmission rate is used to determine the second transmission rate.

For example, the indication frame is described as follows. The indication frame may be a bit rate indication frame, as described in FIG. 3A. Certainly, the indication frame may have another name. This is not limited in this embodiment of this application. In this embodiment of this application, an indication frame is used as an example for description.

A type of the indication frame may be an S (PARAM) frame. For a value of b8b7 in a PCB byte of the indication frame, refer to related descriptions of the S (PARAM) frame in S401. Details are not described herein again. Alternatively, a type of the indication frame may be a S (RATE) frame. For details, refer to related descriptions of the S (RATE) frame in S401. Details are not described herein again.

The indication frame includes a first field, to indicate a frame type of a frame in which the first field is located. For a description of the first field, refer to related descriptions in S401. Details are not described herein again.

For example, information carried in the indication frame is described as follows.

The indication frame includes fourth indication information and fifth indication information. The fourth indication information indicates the third transmission rate used to transmit the first information frame. The third transmission rate is used to determine the first transmission rate. For example, the third transmission rate may be a highest rate that is supported by the PICC and that is used to transmit the first information frame. The third transmission rate may be greater than or equal to the first transmission rate. In other words, the PCD determines the third transmission rate based on the first transmission rate supported by the PICC, to avoid exceeding a transmission capability range of the PICC. A bearer status of the fourth indication information in the indication frame is described as follows: The fourth indication information includes the content indicated by the tag '80' in Table 1, that is, the fourth indication information includes an independent bit rate of the I-block frame from the PCD to the PICC. Alternatively, the fourth indication information includes the content indicated by the tag '81' in Table 1, that is, the fourth indication information includes an independent bit of the I-block frame rate from the PICC to the PCD.

The fifth indication information indicates the fourth transmission rate used to transmit the target frame. For example, the fifth indication information is carried in an extension field of the bit rate indication frame. Table 2 is still used as an example. When the target frame is the R-block frame and the S-block frame, the fifth indication information may include the content indicated by the tag 'x1' in Table 2, that is, the fifth indication information includes the supported independent bit rates of the R-block frame and the S-block frame from the PCD to the PICC. Alternatively, the fifth indication information may include the content indicated by the tag 'x2' in Table 2, that is, the fifth indication information includes the supported independent bit rates of the R-block frame and the S-block frame from the PICC to the PCD. Alternatively, the fifth indication information may include the content indicated by the tag 'x1' and the content indicated by the tag 'x2' in Table 2.

The fourth transmission rate is used to determine the second transmission rate. For example, the fourth transmission rate may be a highest rate that is supported by the PICC and that is used to transmit the target frame. The fourth transmission rate may be greater than or equal to the second transmission rate. In other words, the PCD determines the fourth transmission rate based on the second transmission rate supported by the PICC, to avoid exceeding a transmission capability range of the PICC.

It should be noted that, when the indication frame does not carry the fifth indication information, the PCD may determine, based on the transmission rate of the I-block frame (that is, the first transmission rate), the second transmission rate used to transmit the target frame. In this case, the second transmission rate may be less than or equal to the transmission rate of the I-block frame (that is, the first transmission rate), to prevent the transmission rate of the target frame from exceeding a device capability of the PICC. Alternatively, the PCD obtains in advance a transmission rate that can be stably maintained between the PCD and the PICC, and the PCD determines the second transmission rate based on the stable transmission rate. For example, information exchange may be stably performed between the PCD and the PICC at a rate of 106 Kbps to 848 Kbps, that is, the stable transmission rate is 106 Kbps to 848 Kbps. The second transmission rate is 106 Kbps, that is, the transmission rate of the target frame is within a stable transmission rate range, to ensure that the target frame can be successfully transmitted between the PCD and the PICC. When the indication frame carries the fifth indication information, the PCD determines the second transmission rate based on the fourth transmission rate indicated by the fifth indication information. For details, refer to the example description in the previous paragraph. Details are not described herein again.

In some embodiments, the indication frame further indicates that the PICC supports an independent transmission rate adjustment function for the target frame. For example, the indication frame further includes sixth indication information. The sixth indication information indicates that the PICC supports the independent transmission rate adjustment function for the target frame. The sixth indication information is carried in an extension field of the indication frame. Table 2 is still used as an example. When the target frame is the R-block frame and the S-block frame, the sixth indication information includes the content indicated by the tag 'x3' in Table 2, that is, the sixth indication information includes supported independent frame rates of the S-block frame and the R-block frame.

The sixth indication information is used to determine the second indication information. For example, the PCD determines the second indication information only after determining, based on indication content of the sixth indication information, that the PICC has the independent transmission rate adjustment function for the target frame. Because the second indication information occupies some transmission resources, if the PICC does not have the independent transmission rate adjustment function for the target frame, the PICC cannot identify the second indication information. This wastes transmission resources and increases PCD processing complexity. However, in this embodiment of this application, the PCD determines, based on the sixth indication information, that the PICC has the independent transmission rate adjustment function for the target frame, and then performs S401. This helps save transmission resources.

It should be noted that, when the indication frame does not carry the sixth indication information, after the PCD and the PICC perform S401, if the PICC does not have the independent transmission rate adjustment function for the target frame, the PICC cannot identify the second indication information, and still performs processing according to the step process shown in FIG. 3A. On the contrary, if the PICC has the independent transmission rate adjustment function for the target frame, the PICC successfully identifies the second indication information, and performs processing according to S401, S402, S403a, and S403b. When the indication frame carries the sixth indication information, the PICC may determine, based on the indication content of the sixth indication information, to perform processing according to S401, S402, S403a, and S403b.

It should be understood that, in this embodiment of this application, frame types of the request frame, the indication frame, the activation frame, and the acknowledgment frame are consistent. For example, the request frame, the indication frame, the activation frame, and the acknowledgment frame all belong to an S (PARAM) frame, or the request frame, the indication frame, the activation frame, and the acknowledgment frame all belong to an S (RATE) frame. For example, in the S (RATE) frame, the request frame, the indication frame, the activation frame, and the acknowledgment frame all include a first field, to indicate a frame type of a frame in which the first field is located. For a description of the first field, refer to related descriptions in S401. Details are not described herein again.

It is easy to understand that, in this embodiment of this application, when both the PCD and the PICC have the independent transmission rate adjustment function for the target frame, S401 to S405 are performed. If at least one of the PCD and the PICC does not have the independent transmission rate adjustment function for the target frame, neither S401 nor S405 can be performed, and the PCD and the PICC may perform data transmission by using the process shown in FIG. 3A.

Figure 6:
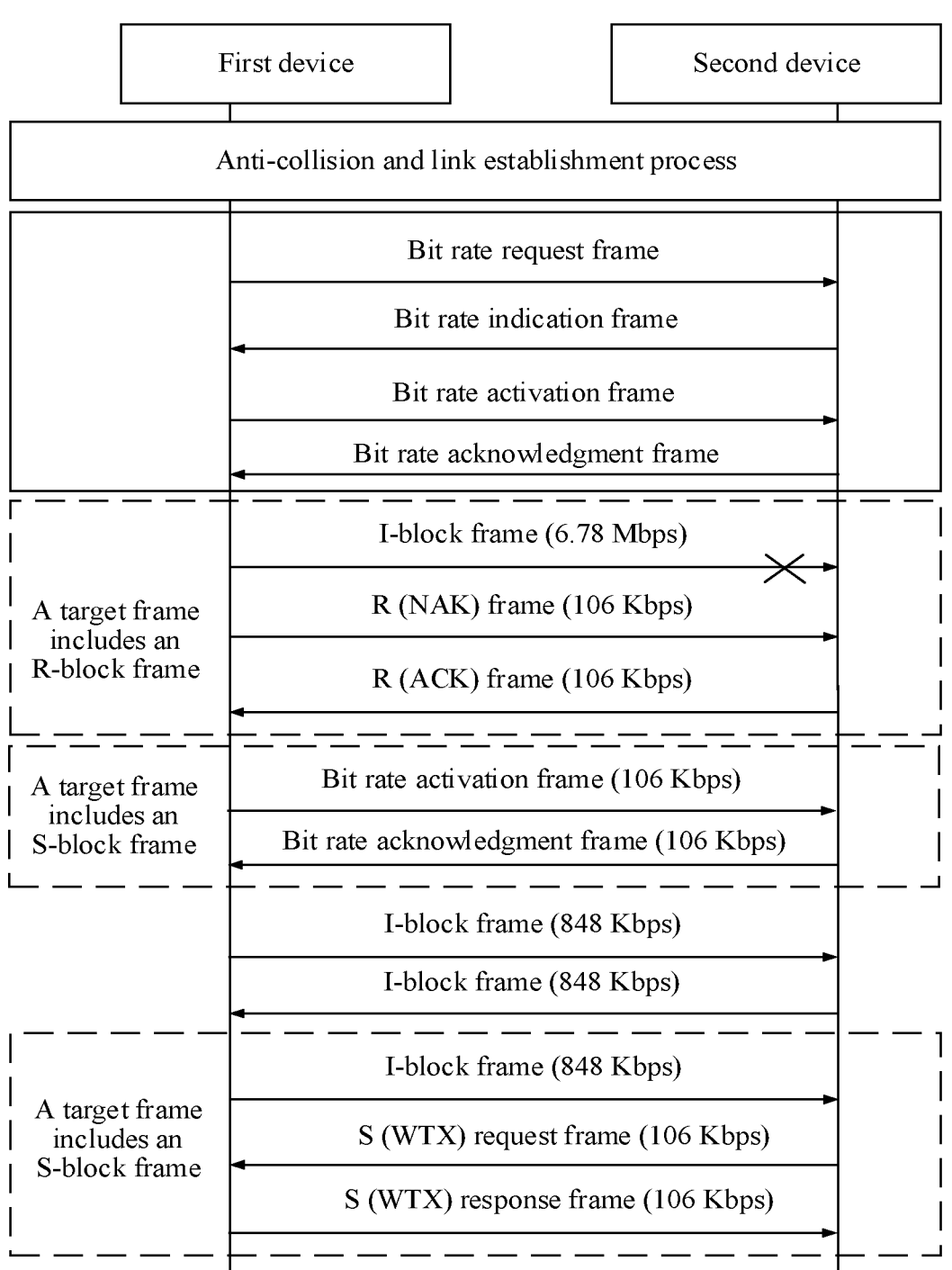
FIG. 6 is a schematic flowchart of yet still another transmission rate determining method according to an embodiment of this application.

For example, a scenario shown in FIG. 6 is used as an example for description. In FIG. 6, the first information frame is implemented as an I-block frame, the second information frame is implemented as an R-block frame, and the third information frame is implemented as an S-block frame. The PCD and the PICC can exchange information at a rate of 106 Kbps to 848 Kbps, and both support a transmission rate of 6.78 Mbps. To improve a data throughput, the PCD actively increases the transmission rate. The PCD and PICC exchange information at a rate of 6.78 Mbps. However, the PCD and PICC cannot maintain the transmission rate of 6.78 Mbps due to an external factor. For the transmission of the request frame, the indication frame, the activation frame, and the acknowledgment frame between the PCD and the PICC, refer to the descriptions of S401, S402, S404, and S405. The first transmission rate is 6.78 Mbps, and the second transmission rate is 106 Kbps.

For example, the second information frame includes an R-block frame. As shown in the first dashed line box in FIG. 6, the PCD sends an I-block frame to the PICC at a rate of 6.78 Mbps, but the PICC cannot successfully receive the I-block frame. Therefore, the PICC does not feed back an R (ACK) frame to the PCD. If the PCD does not receive the R (ACK) frame from the PICC within preset duration, the PCD sends an R (NAK) frame to the PICC at a rate of 106 Kbps (that is, the second transmission rate). Correspondingly, the PICC receives the R (NAK) frame from the PCD. Then, in response to the R (NAK) frame, the PICC sends the R (ACK) frame to the PCD at a rate of 106 Kbps (that is, the second transmission rate). Correspondingly, the PCD receives the R (ACK) frame from the PICC. That is, the R (ACK) frame and the R (NAK) frame are used between the PCD and PICC to maintain the link between the devices to avoid link interruption.

For another example, the third information frame includes the S-block frame. As shown in the second dashed line box in FIG. 6, when the PCD determines that the I-block frame fails to be transmitted for a plurality of times and the link between the PCD and the PICC is still maintained, the PCD sends the bit rate activation frame to the PICC at a rate of 106 Kbps (that is, the second transmission rate). Correspondingly, the PICC receives the bit rate activation frame from the PCD. The transmission rate indicated by the bit rate activation frame is 848 Kbps. In response to the bit rate activation frame, the PICC sends the bit rate acknowledgment frame to the PCD at a rate of 106 Kbps (that is, the second transmission rate). Correspondingly, the PCD receives the bit rate acknowledgment frame from the PICC. Then, the I-block frame is transmitted between the PCD and the PICC at a stable rate of 848 Kbps (that is, the transmission rate indicated by the bit rate activation frame in the second dashed line box).

For another example, the third information frame includes the S-block frame. As shown in the third dashed line box in FIG. 6, the PCD sends the I-block frame to the PICC at a rate of 848 Kbps (that is, the transmission rate indicated by the bit rate activation frame in the second dashed line box). Correspondingly, the PICC receives the I-block frame from the PCD. When the PICC needs a long time to process the I-block frame, the PICC still sends an S (WTX) request frame to the PCD at a rate of 106 Kbps (that is, the second transmission rate). Correspondingly, the PCD receives the S (WTX) request frame from the PICC. Then, in response to the S (WTX) request frame, the PCD still sends an S (WTX) response frame to the PICC at a rate of 106 Kbps (that is, the second transmission rate). Correspondingly, the PICC receives the S (WTX) response frame from the PCD.

It can be learned from the cases described in the foregoing three dashed-line blocks that, based on the transmission rate determining method 400 in this embodiment of this application, the transmission rate of the target frame is independent of the transmission rate of the I-block frame, so that a high data throughput can be implemented between the PCD and the PICC, link stability can be improved, and unnecessary link disconnections can be reduced.

It should be noted that in this embodiment of this application, the transmission rate includes a sending rate, or includes a receiving rate, or includes a sending rate and a receiving rate. That is, the transmission rate includes at least one of the following items.

A first item is a rate at which the PCD sends an information frame (for example, a first information frame, a second information frame, a third information frame, a request frame, an indication frame, an activation frame, or an acknowledgment frame) to the PICC. In other words, the first item is the rate at which the PICC receives the information frame from the PCD.

A second item is a rate at which the PICC sends an information frame to the PCD. In other words, the second item is the rate at which the PCD receives the information frame from the PICC.

The foregoing mainly describes, from a perspective of interaction between devices, the solutions provided in embodiments of this application. Correspondingly, an embodiment of this application further provides a communication apparatus. The communication apparatus may be the device in the foregoing method embodiment, or an apparatus including the foregoing device, or a component that can be used in a device. It may be understood that, to implement the foregoing functions, the communication apparatus includes a hardware structure and/or a software module for performing a corresponding function. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 7:
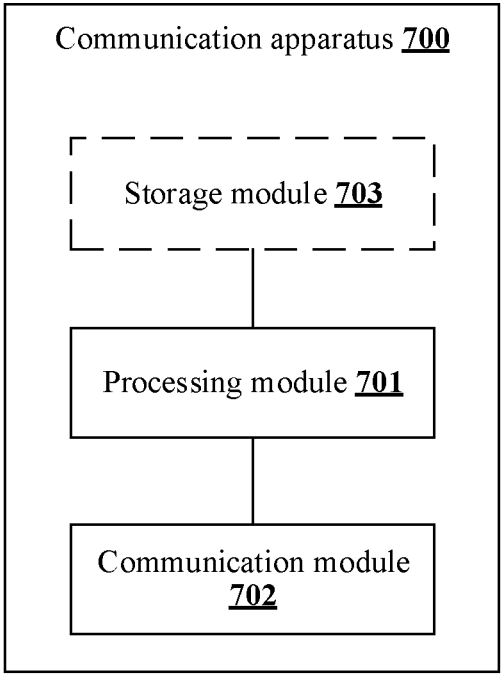
FIG. 7 is a schematic diagram of a structure of a communication apparatus according to an embodiment of this application.

For example, FIG. 7 is a schematic diagram of a structure of a communication apparatus 700. The communication apparatus 700 includes a processing module 701 and a communication module 702.

In a possible example, the communication apparatus 700 is a PCD. The processing module 701 is configured to control the communication module 702 to perform S401, S402, S403*a*, and S403*b* in FIG. 4A, S404 and S405 in FIG. 5, and/or another processing operation that needs to be performed by the PCD in this embodiment of this application. The communication module 702 is configured to support the PCD in performing S401, S402, S403*a*, and S403*b* in FIG. 4A, S404 and S405 in FIG. 5, and/or another receiving and sending operation that needs to be performed by the PCD in this embodiment of this application.

In still another possible example, the communication apparatus 700 is a PICC. The processing module 701 is configured to control the communication module 702 to perform S401, S402, S403*a*, and S403*b* in FIG. 4A, S404 and S405 in FIG. 5, and/or another processing operation that needs to be performed by the PICC in this embodiment of this application. The communication module 702 is configured to support the PICC in performing S401, S402, S403*a*, and S403*b* in FIG. 4A, S404 and S405 in FIG. 5, and/or another receiving and sending operation that needs to be performed by the PICC in this embodiment of this application.

Optionally, the communication apparatus 700 may further include a storage module 703, configured to store program code and data of the communication apparatus. The data may include but is not limited to original data, intermediate data, or the like.

The processing module 701 may be a processor, a controller, or a logic circuit, for example, may be a central processing unit (CPU), a general-purpose processor, an application-specific integrated circuit (ASIC), a field-programmable gate array (FPGA), or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the digital signal processor (DSP) and a microprocessor.

The communication module 702 may be a communication interface, a transmitter, a transmitter circuit, a receiver, a receiver circuit, or the like. The communication interface is a general term. In specific implementation, the communication interface may include a plurality of interfaces.

The storage module 703 may be a memory.

When the processing module 701 is a logic circuit, the communication module 702 is a communication interface, and the storage module 703 is a memory. The communication apparatus in this embodiment of this application may be shown in FIG. 8.

Figure 8:
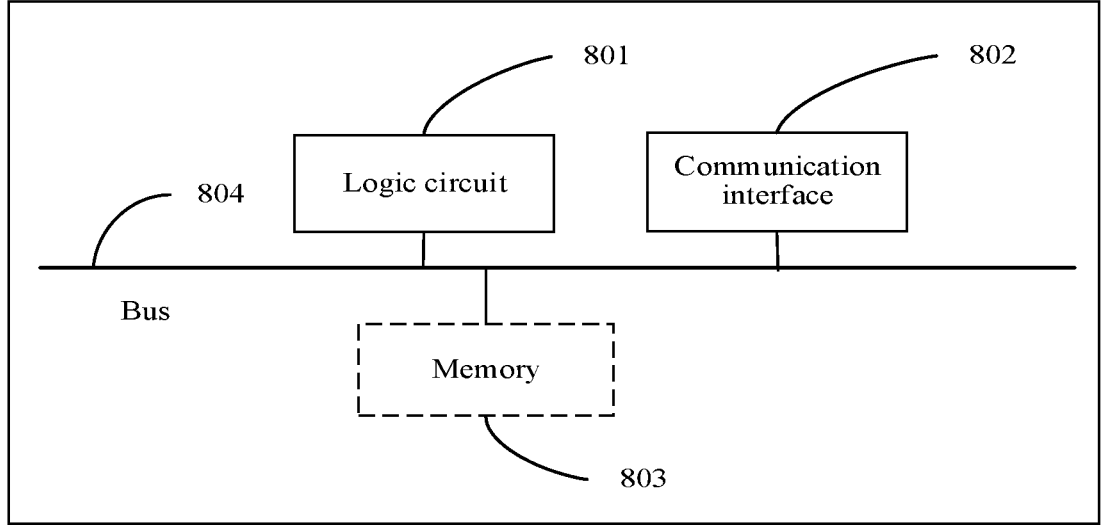
FIG. 8 is a schematic diagram of a structure of another communication apparatus according to an embodiment of this application.

Refer to FIG. 8. The communication apparatus includes a logic circuit 801, a communication interface 802, and a bus 804. Optionally, the communication apparatus may further include a memory 803. The communication interface 802, the logic circuit 801, and the memory 803 may be connected to each other by using the bus 804. The bus 804 may be a Peripheral Component Interconnect (PCI) bus, an Extended Industry Standard Architecture (EISA) bus, or the like. The bus 804 may be classified as an address bus, a data bus, a control bus, or the like. For ease of representation, only one thick line is used for representing the bus in FIG. 8, but this does not mean that there is only one bus or only one type of bus.

Optionally, an embodiment of this application further provides a computer program product that carries computer instructions. When the computer instructions are run on a computer, the computer is enabled to perform the method described in the foregoing embodiments.

Optionally, an embodiment of this application further provides a computer-readable storage medium. The computer-readable storage medium stores computer instructions. When the computer instructions are run on a computer, the computer is enabled to perform the method described in the foregoing embodiments.

Optionally, an embodiment of this application further provides a chip, including a logic circuit and a transceiver pin. The logic circuit and the transceiver pin are configured to implement the method described in the foregoing embodiments. The processing circuit is configured to perform a processing action in a corresponding method, and the transceiver pin is configured to perform a receiving/sending action in the corresponding method.

A person of ordinary skill in the art may understand that all or some of the foregoing embodiments may be implemented by software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DIGITAL VERSATILE DISC (DVD)), a semiconductor medium (for example, a solid-state disk (SSD)), or the like.

In the several embodiments provided in this application, it should be understood that the disclosed system, apparatus, and method may be implemented in other manners. For example, the described apparatus embodiment is merely an example. For example, division into the modules is merely logical function division and may be other division in an actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electronic or other forms.

The units described as separate parts may or may not be physically separate, and parts displayed as units may or may not be physical units, may be located in one position, or may be distributed on a plurality of network devices. Some or all of the units may be selected based on actual requirements to achieve the objectives of the solutions of embodiments.

Based on the foregoing descriptions of the implementations, a person skilled in the art may clearly understand that this application may be implemented by software in addition to necessary universal hardware or by hardware only. In most circumstances, the former is a preferred implementation. Based on such an understanding, the technical solutions in this application essentially or the part contributing to the conventional technology may be implemented in a form of a software product. The computer software product is stored in a readable storage medium, such as a floppy disk, a hard disk or an optical disc of a computer, and includes several instructions for instructing a computer device (which may be a personal computer, a server, a network device, or the like) to perform the methods described in embodiments of this application.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method implemented by a proximity coupling device (PCD), wherein the method comprises:

sending, to a proximity integrated circuit card (PICC), an activation frame indicating a first transmission rate to transmit a first information frame and a second transmission rate to transmit a target frame, wherein the first information frame transmits application information, wherein the target frame comprises at least one of a second information frame or a third information frame, wherein the second information frame transmits receive ready information, and wherein the third information frame transmits control information;

receiving, from the PICC, an acknowledgment frame indicating that the PICC has received the activation frame;

sending the first information frame with the PICC at the first transmission rate; and sending the target frame with the PICC at the second transmission rate.

2. The method of claim 1, wherein the activation frame further indicates that a status of an independent transmission rate adjustment function for the target frame is enabled.

3. The method of claim 1, wherein the activation frame is a bit rate activation frame.

4. The method of claim 1, wherein a type of the activation frame is a supervisory block containing a parameter S (PARAM) frame.

5. The method of claim 1, further comprising:

sending, to the PICC, a request frame requesting a supported transmission rate of the PICC; and receiving, from the PICC, an indication frame indicating the PICC supports a third transmission rate, wherein the third transmission rate comprises a fourth transmission rate to transmit the first information frame and a fifth transmission rate to transmit the target frame, wherein the fourth transmission rate determines the first transmission rate, and wherein the fifth transmission rate determines the second transmission rate.

6. The method of claim 5, wherein the indication frame is a bit rate indication frame.

7. The method of claim 5, wherein the indication frame further indicates that the PICC supports an independent transmission rate adjustment function for the target frame, and wherein the independent transmission rate adjustment function determines the second transmission rate.

8. The method of claim 5, wherein a type of the indication frame is a supervisory block containing a parameter (S (PARAM)) frame.

9. The method of claim 5, wherein a type of the indication frame is a supervisory block containing a rate (S (RATE)) frame.

10. The method of claim 9, wherein the indication frame comprises a first field indicating that the type of the indication frame is the S (RATE) frame.

11. The method of claim 10, wherein the first field is a protocol control byte (PCB) field, and wherein values of a second bit, a fifth bit, and a sixth bit in the PCB field are preset values.

12. The method of claim 1, wherein a type of the activation frame is a supervisory block containing a rate (S (RATE)) frame.

13. The method of claim 12, wherein the activation frame comprises a first field indicating that the type of the activation frame is the S (RATE) frame.

14. The method of claim 1, wherein the second transmission rate is less than or equal to the first transmission rate.

15. The method of claim 1, wherein the first information frame comprises an information block (I-block) frame, the second information frame comprises a receive ready block (R-block) frame, and the third information frame comprises a supervisory block (S-block) frame.

16. A method implemented by a proximity integrated circuit card (PICC), wherein the method comprises:

receiving, from a proximity coupling device (PCD), an activation frame indicating a first transmission rate to transmit a first information frame and a second transmission rate to transmit a target frame, wherein the first information frame transmits application information, wherein the target frame comprises at least one of a second information frame or a third information frame, wherein the second information frame transmits receive ready information, and wherein the third information frame transmits control information;

sending, to the PCD, an acknowledgment frame indicating that the PICC has received the activation frame;

sending the first information frame with the PCD at the first transmission rate; and sending the target frame with the PCD at the second transmission rate.

17. The method of claim 16, further comprising:

receiving, from the PCD, a request frame requesting a supported transmission rate of the PICC; and sending, to the PCD, an indication frame indicating the PICC supports a third transmission rate, wherein the third transmission rate comprises a fourth transmission rate to transmit the first information frame and a fifth transmission rate to transmit the target frame, wherein the fourth transmission rate determines the first transmission rate, and wherein the fourth transmission rate determines the second transmission rate.

18. The method of claim 17, wherein the indication frame is a bit rate indication frame.

19. The method of claim 17, wherein the indication frame further indicates that the PICC supports an independent transmission rate adjustment function for the target frame, and wherein the independent transmission rate adjustment function determines the second transmission rate.

20. A communication apparatus, comprising:

an input/output interface configured to communicate with the communication apparatus; and a logic circuit coupled to the input/output interface and configured to:

send, to a proximity integrated circuit card (PICC) and using the input/output interface, an activation frame indicating a first transmission rate to transmit a first information frame and a second transmission rate to transmit a target frame, wherein the first information frame transmits application information, wherein the target frame comprises at least one of a second information frame or a third information frame, wherein the second information frame transmits receive ready information, and wherein the third information frame transmits control information;

receive, from the PICC and using the input/output interface, an acknowledgment frame indicating that the PICC has received the activation frame;

send the first information frame with the PICC at the first transmission rate; and send the target frame with the PICC at the second transmission rate.

* * * * *